(12) United States Patent
South et al.

(10) Patent No.: US 8,117,726 B1
(45) Date of Patent: Feb. 21, 2012

(54) LINE OF SIGHT PRECISION MACHINING

(75) Inventors: Matthew E. South, Orlando, FL (US); Jan de Nijs, Gotha, FL (US); Gary S. Walls, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 479 days.

(21) Appl. No.: 12/410,302

(22) Filed: Mar. 24, 2009

(51) Int. Cl.
*B23Q 17/00* (2006.01)
(52) U.S. Cl. .................................. 29/407.09
(58) Field of Classification Search ........... 29/407.09, 29/407.05, 428, 464, 465, 467, 469; 359/896
See application file for complete search history.

(56) References Cited

U.S. PATENT DOCUMENTS 6,519,101 B2 * 2/2003 Bell et al. ............. 359/896

* cited by examiner

*Primary Examiner* — John C Hong
(74) *Attorney, Agent, or Firm* — Jeffrey D. Myers; Peacock Myers, P.C.; Timothy D. Stanley

(57) ABSTRACT

A method of assembling an optical device and an optical device manufactured by placing in a housing an optical element comprising one or more interface datums, aligning the optical element to a reference feature to determine an amount of finish machining of the one or more interface datums needed, and finish machining the one or more interface datums according to the results of the aligning.

10 Claims, 3 Drawing Sheets

LINE OF SIGHT PRECISION MACHINING

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods of fabrication and assembly of optical hardware to minimize problems arising from such fabrication and assembly.

2. Description of Related Art

The increasing optical performance requirements of optical systems are driving tighter tolerances and increased cost to all phases of design, machining, assembly and inspection operations. Often, optical assemblies that were intended to be free of adjustments do in fact have problems at line-replaceable unit (LRU) or system test levels that require shimming or ad hoc adjustment. This can be especially prevalent during the start up phase of a program when new processes may be more likely to yield hardware close to the extremes of the tolerance bands. These unfavorable tolerance stackups result in low test yields, more quality defects (QDs), higher levels of recurring support, LRU interchangeability problems and contribute to overall cost and schedule problems. A method to minimize the impact of these tolerance stackups in the fabrication and assembly of optical hardware is needed, and such method is provided by the present invention.

BRIEF SUMMARY OF THE INVENTION

The present invention is of a method of assembling an optical device and an optical device manufactured by the process of: placing in a housing an optical element comprising one or more interface datums; aligning the optical element to a reference feature to determine an amount of finish machining of the one or more interface datums needed; and finish machining the one or more interface datums according to the results of the aligning. In the preferred embodiment, one repeats the aligning after the finish machining, and preferably additionally repeating the finish machining after repeating the aligning. The reference feature comprises a null wavefront orientation plane and/or a reference cube (most preferably a one-inch reference cube). Aligning employs an interferometer. The housing and optical element are reassembled after the finish machining, preferably resulting in an alignment of the optical element within about 120 arc seconds of the line of sight of the optical device, and most preferably within about 60 arc seconds.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention provides a method for fabrication of optical systems comprising finish machining the assembly level interface datums relative to the optical axis and to use such a method to make test cuts on a piece of sample hardware to make a first order evaluation of the method's capability. The method preferably comprises aligning a reference feature relative to the actual line of sight of the optical assembly under test, then probing that reference feature to align it to the coordinate system of the machine tool, and finish machining the assembly interface datums to the desired dimensions.

Typically the issue of stackup of optical tolerances influencing the line of sight is controlled by extremely precise fabrication tolerances on the housings, optics and assembly operations. Also, adjustment features are often designed in to allow for final assembly and test level adjustments to meet the final requirements. In situations where no adjustment features are available, but the unit does not meet the required specifications, quality documents are generated to allow a customer approved repair such as shimming or other ad hoc adjustment.

Direct machining of accurately positioned assembly interface datums eliminates adjustments, reduces parts count, improves program start up performance through reduced QDs, improved LRU interchangeability, and reduced support levels, and produces products that are more robust over temperature and vibration. All the processes required to implement the Line of Sight Precision Machining method of the invention are well understood and currently utilized on production programs. The present invention provides is a novel rearrangement of existing technologies in order to reduce the effect of the tolerance stackups inherent in the current method of manufacture of highly complex precision optical products.

Figure 1:
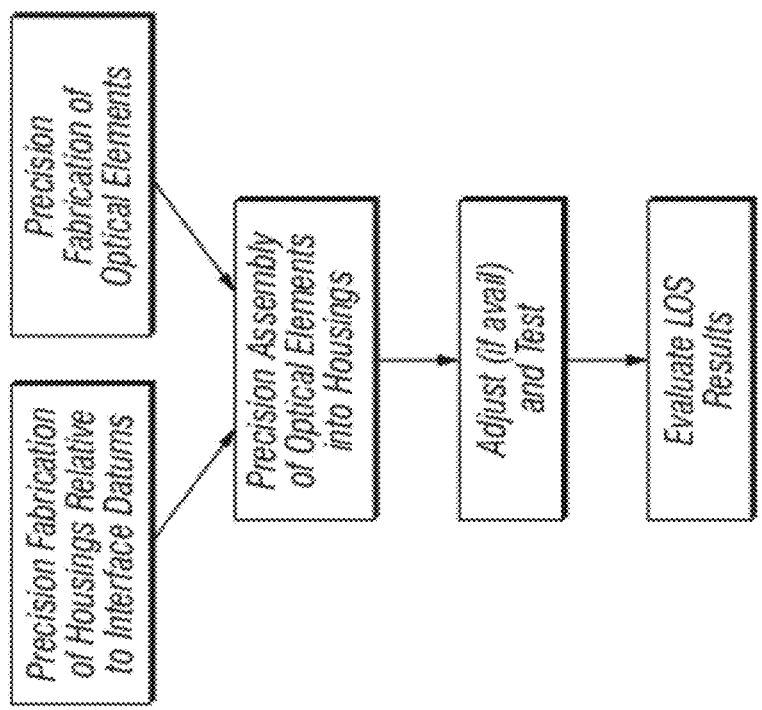
FIG. 1 is a flow diagram of the prior art method of fabrication of optical systems comprising interface datums.

FIG. 1 illustrates the prior art method of fabrication. A housing is precision fabricated with respect to a plurality of interface datums, and optical elements are also precision fabricated. The optical elements and the housing are precision assembled. Then, if adjustment is possible, the result is adjusted and then tested, and then the line-of-sight (LOS) results are evaluated.

Figure 2:
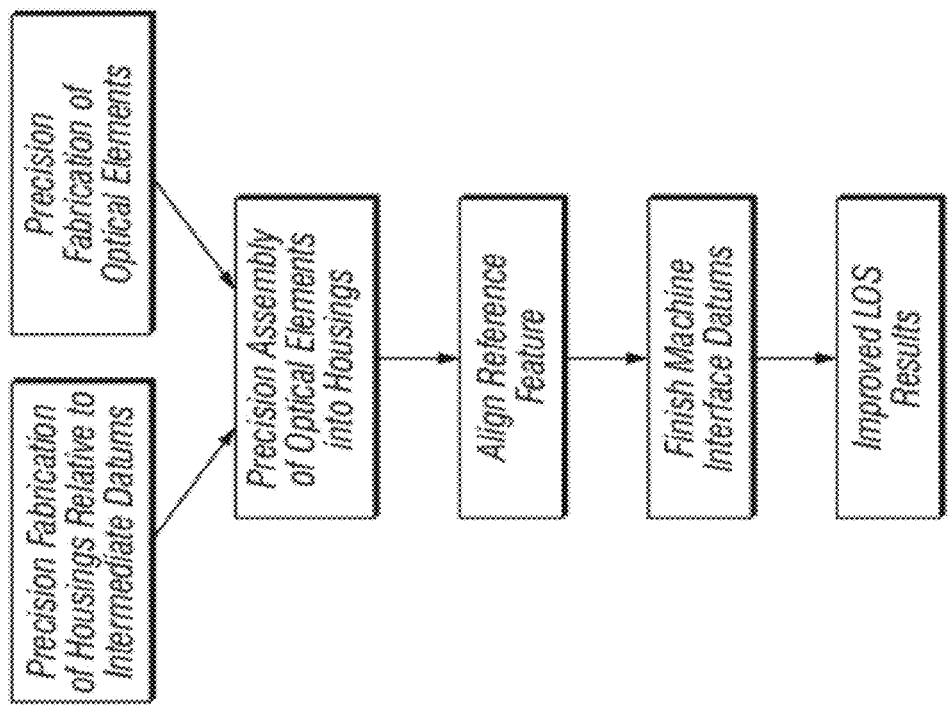
FIG. 2 is a flow diagram of the method of the present invention.

As shown in FIG. 2, the present invention after assembly aligns the result to a reference feature and then finish machines one or more of the interface datums. Improved LOS results are thereby attained.

Figure 3:
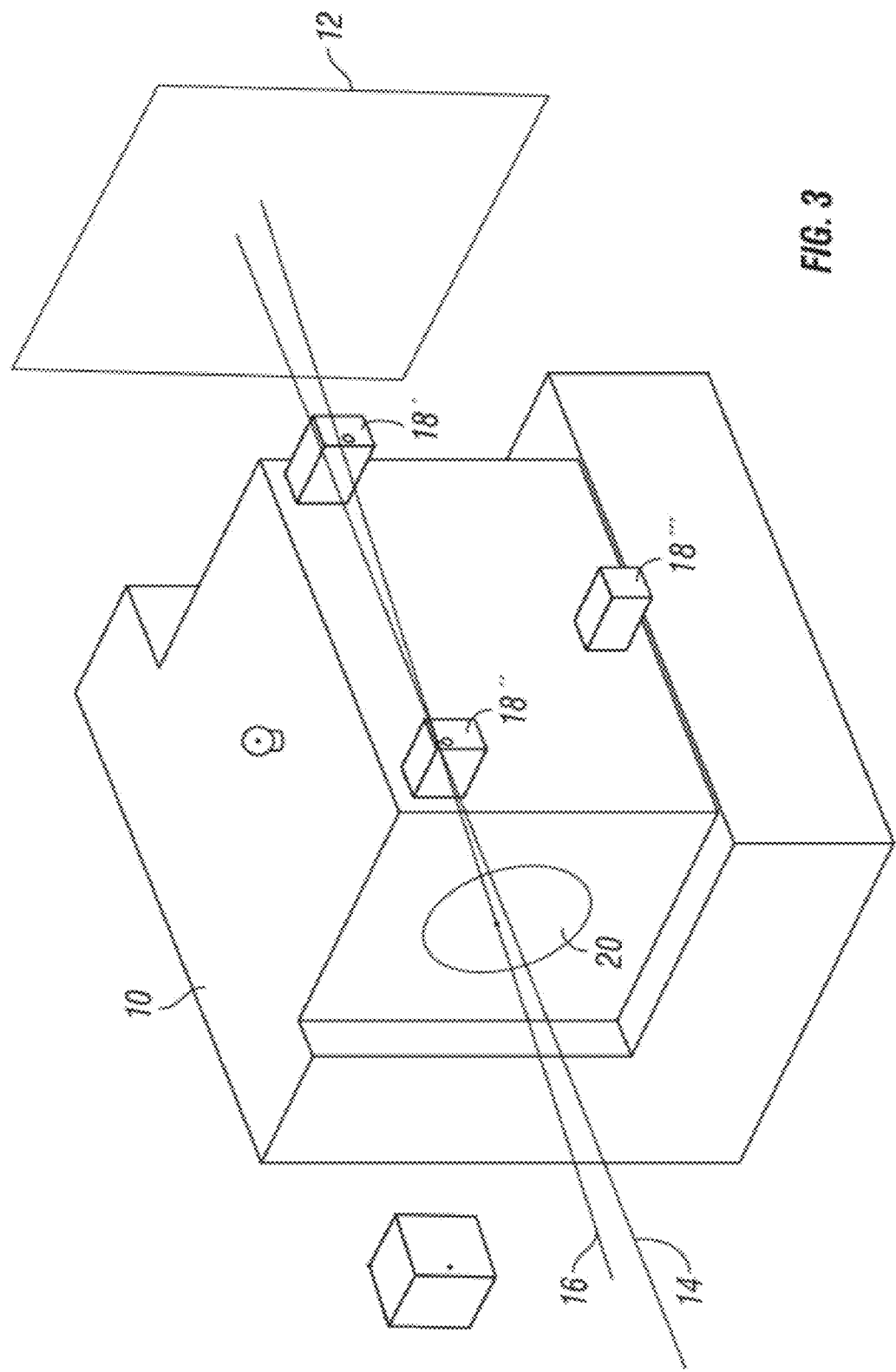
FIG. 3 is a perspective view of a sample optical system after having been assembled and in the process of alignment to a reference feature.
Figure 4:
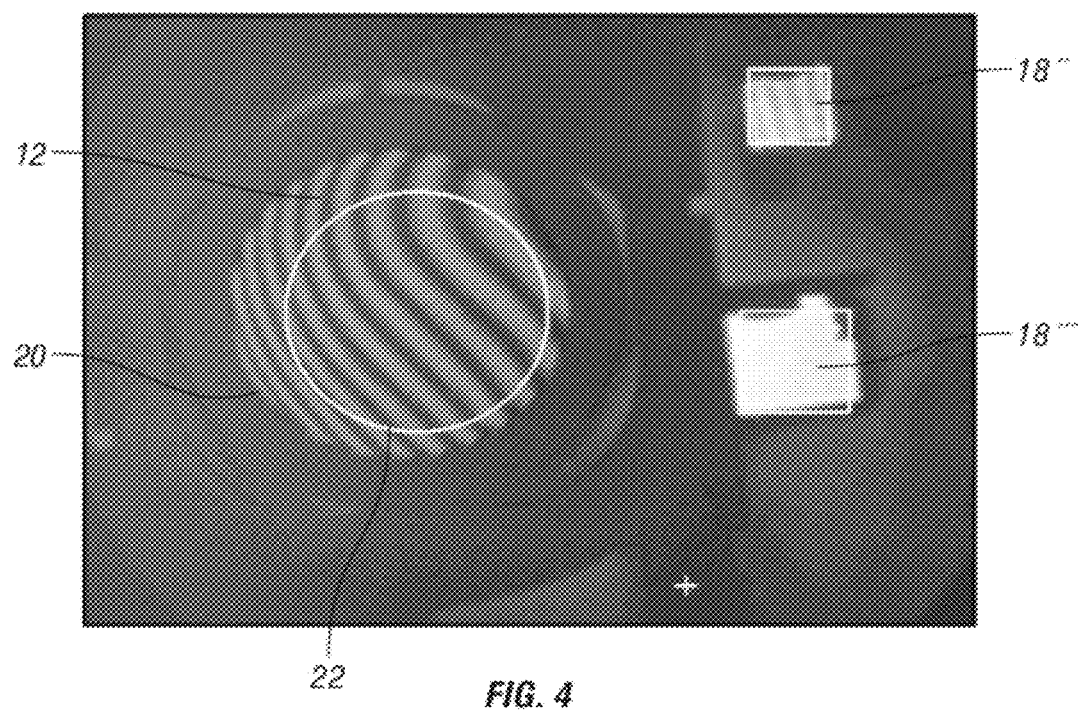
FIG. 4 is a front view of the optical system of FIG. 3 showing alignment to a reference feature, after which the interface datums can be appropriately machined.

FIG. 3 shows a sample optical system 10 after assembly and being aligned to a reference feature via interface datums 18', 18", 18"', in this case to a null wavefront orientation plane 12. The intended optical axis 14 is shown, and the resulting actual axis 16 of the optical element 20. FIG. 4 shows the result, with a circle 22 shown with its center on the intended optical axis. The datums in this instance need adjusted by 6 arc sec to achieve the desired alignment for the optical system, and the datums can therefore be appropriately finish machined to achieve that adjustment, as would be well understood by one of ordinary skill in the art.

Example 1

A Pro/ENGINEER (Pro/E; Parametric Technology Corporation) model of the process of the present invention was created to determine if the geometries involved were in fact fully defined such that they could be properly communicated on an engineering drawing and to understand what type of setups and measurements were required.

The model allowed the simulated actual optical axis to be arbitrarily tilted relative to the design optical axis to simulate the effect of tolerance stackup on the line of sight. The null wavefront orientation plane was used to simulate the relative position of the part in the interferometer cavity, and the green model of the reference cube was constrained such that it would move with the simulated axis and the null wavefront orientation plane to simulate the reference feature being aligned to the cavity. The final cuts to make the plane on the three mounting pads, and the two pin holes, were defined in X-Y-Z space relative to the tooling ball on the nominal design centerline, but with that X-Y-Z coordinate system aligned to the reference cube and null wavefront orientation plane. Making these cuts in an orientation based on the cube simulates the effect of probing the cube to zero the part out in machine space relative to that orientation.

The model showed this process to be fully defined, except that the roll of the reference cube about the optical axis theoretically has infinite solutions. In practice, the reference cube would be preset in roll relative to a reference surface on the fixture or part in order to limit the projected positional variation of the outer envelope of the housing. Roll has no effect on the optical performance of typical optical assemblies except in special cases of vignetting of non-circular apertures. In either case, the presetting of the roll of the reference cube relative to a known surface on the fixture or housing reduces the effect to an inconsequential amount. For example, even the relatively large value of 1 minute of roll results in less than 0.0005 inch of potential vignetting in a 6 inch non-circular aperture system. The presetting of the roll was not specifically measured when doing the actual test cuts as it is easily understood and not fundamental to the capability of the process. The cube was however roughly aligned for roll in the initial fixture setup.

With the developmental process fully conceptualized and the Pro/E model verifying its utility, the process for the example can be summarized as follows:

Null the return mirror to the interferometer.
Preset roll of reference cube to fixture/part.
Place the part/fixture/reference cube in the cavity.
Adjust position of part in cavity to minimize tilt as measured by interferometer.
Adjust reference cube to minimize tilt as measured by interferometer.
Lock down relative position of part and reference cube (tack bonding of Newport stage was used in this test).
Mount fixture/part on machine tool. Probe reference cube and adjust machine tool to bring the reference cube to a zero tilt position in all three planes.
Make required cuts to mounting plane and pin holes relative to the tooling ball.
Install pins in part.
Verify the newly machined datums relative to the optical axis using a Zygo block and interferometer.

It is important to note that the invention changes the sequence to machine the interface datums of the optical housing relative to the actual optical axis at the end of the process rather than machining the design optical axis relative to the interface datums at the beginning of the process. However, in order to physically test this process, an actual part, test pieces, fixture and a test layout had to be designed and fabricated.

The first step in the design process was to select the optics to be used. A high quality, off the shelf afocal optical assembly in the visible wavelengths was judged to be most practical. Several camera lenses were considered, as well as a variety of laser beam expanders. A Special Optics 5×100 mm output aperture Beam Expander was selected.

With the optics chosen, the next step was a high quality reference feature. The main requirements were very accurate orthogonality and durable, high quality surfaces for reliable probing. Also, with the larger the span of the reference feature, the greater accuracy that can be achieved for a given probe repeatability. For a proof of concept, it was judged that a moderately sized block would be sufficient. A 1 inch, 1 arc second Croblox Reflecting Cube was selected.

In addition to an accurate reference feature, an accurate tip/tilt/rotation stage was required to adjust it to the orientation of the measured optical axis. A Newport Model 37 Micrometer Tip Tilt Rotation Stage was selected.

With the main components identified, detail design of the fixture and test housing could begin. Because the housing of the Special Optics Beam Expander is very robust, it was decided that instead of a fixture and a separate additional housing, the fixture could be designed such that it served a dual purpose of machining fixture and simulated housing onto which the interface datums would be machined. Two-inch cast aluminum Mic-6 jig plate was selected for the material due to its rigidity and stability.

With the fixture design complete, the details of the test layout could be finalized. The entire fixture needed to be adjusted in pitch and yaw to position the beam expander in the cavity such that tilt was minimized as measured by the interferometer. Tooling, consisting of an aluminum plate with three adjustment screws for tip and tilt and a rotation stage for yaw, was employed to provide this capability.

By utilizing a 12-inch visible Zygo interferometer, the fixture and tooling fit easily into the aperture. A few initial practice alignments were made to verify the function of the adjustments and verify that initial setup accuracies on the order of a few seconds could be achieved.

An application in the interferometer software to measure tilt angles based on a feature of known size (in this case the 1 inch reference cube) was used to determine that the available adjustments allowed the return mirror, the beam expander and the reference cube to each be set to approximately 1 arc second of tilt. Repeatability of these measurements was excellent, typically significantly less than 1 arc second. Stability of the reference cube relative to the beam expander was fairly good as well after tack bonding of the Newport stage. General handling, repeated tapping, and miscellaneous manipulations of the fixturing resulted in drifts of only a few arc seconds.

With the test setup complete and validated, one was able to calculate the predicted performance we could achieve with this process. The expected capability of the proposed process is predicted by the interaction of all the relevant tolerances. A basic tolerance analysis is shown in Table 1. The individual tolerance values contained in the table were derived from actual measurements of the test hardware, past experience with machine tool capability, and consulting with a variety of personnel.

TABLE 1

Tolerance Analysis of Process

| Tolerance Description | Tol (arc sec) | Comments |
|---|---|---|
| Return Mirror Tilt | 1 | empirical measurement |
| Beam Expander Tilt in cavity | 1 | empirical measurement |
| Reference Cube Orthogonality | 1.7 | catalog data |
| Reference Cube to Beam Expander | 1.5 | empirical measurement |
| Handling Stability of Ref Cube Position | 3 | estimated from handling in lab during test layout validation |
| Probing Accuracy on Cube | 9 | from discussions with MOC personnel, assumes 40e-6 probe accuracy over a .9 inch usable span of the ref cube. |
| Profile Tolerance of Plane Cut | 10 | from discussions with MOC personnel, similar to tolerances on production parts and the Mfg Capabilities Document - assumes .0003 over a 6 inch span |
| Composite Size/Position/Perp Tolerance on Pins | 17 | from discussions with MOC personnel, similar to tolerances on production parts and the Mfg Capabilities Document - assumes .0005 over a 6 inch span |
| Zygo Block Orthogonality | 1.7 | vendor spec |
| Mating Uncertainty of Zygo Block to machined datums | 5 | estimated from measurements in lab during test layout validation |
| Worst Case | 51 | |
| 1.5 RSS | 34 | |
| RSS | 23 | |

With the test hardware fabricated, the test layout validated and a basic understanding of the types of values expected, preparations for making the actual test cuts could begin. Once the test fixture was mounted on the machine tool, a control program was written to probe the reference cube and calculate the required position adjustments to zero the reference cube to the machine space. Six points were defined on the cube, four on the top plane and two on one of the vertical faces. Relative measurements between points were used to calculate the required angular corrections. An average of four measurements at each point was used, as well as averages of the offsets calculated between different pairs of the six points.

The two-axis rotation of the machine tool rotary table was used to align the test fixture/reference cube to the machine space in two axes. Alignment of the third axis would be dealt with by offsetting the location of the pin holes during machining by measuring the slope in that axis across a known probing distance and extrapolating an appropriate offset to the pin centerline distance. For example, 0.0001 measured over a 1 inch span would require a 0.0005 offset over a 5 inch pin hole centerline.

The probing test runs showed that the probe repeatability of 40e-6 inch assumed in Table 1 was optimistic. There was at least one data point in each run that varied up to 0.0001. The averages of multiple measurements at each point, and the average of the position differences of multiple point pairs, served to filter out some of this variation. Probing accuracy and repeatability is however directly related to the potential capability of this process.

Another issue with the test run was that the initial table movement created an unusual vibration. One of the brakes was apparently not fully disengaged and the machine was promptly shut down to correct the issue. During the movement, the test fixture experienced noticeable vibrations that were noted as having, along with the compression probing experiment, possibly disturbed the position of the reference cube relative to the beam expander. Because this would be verified after the cut, and due to limited available time on the machine tool, the decision was made to proceed.

Two iterations of the probe software program and table position adjustments resulted in aligning the reference cube to two axes of the machine space to within ~8 arc seconds. The required pin position offset to account for the third axis was measured and calculated to be 0.00422 inch. With the machine tool under manual control, a minimum full cleanup cut was made to create the plane. Additionally, two pin holes were drilled, a large countersink added, and the holes reamed at the nominal centerline spacing with the 0.00422 calculated Y offset. All machine cuts were made with no coolant and a light application of machine oil. The large countersink was used to reduce the possibility of displaced material from the pin press locally distorting the plane cut. FIG. 14 shows the initial cuts in progress.

The original intent was to use 0.1875" pins lightly pressed into the pin holes. However, the drilling and 0.1873 reaming operations produced holes that were slightly too large for a 0.1875 press fit. The manual operation of the machine, no coolant, limited lubrication and no process development for our particular cutting arrangement likely accounts for the inconsistency. No incrementally smaller reamer was available at the time of the cuts, so the decision was made to use Deltronic pins to find a best fit pin size for each hole.

Returning to the lab to make the measurements and assess the results of the first cut, it was immediately found that the best fit Deltronic pins comparatively loose fitting relative to the desired tolerances. Another issue was that the reference cube position relative to the beam expander had been disturbed. Originally set to less than 1 arc second of relative position, the reference cube had moved to ~13 arc seconds. Nevertheless, the final results were encouraging. The position of the newly machined datums relative to the reference cube was ~5 arc seconds and the position of the newly machined datums relative to the beam expander line of sight was ~15 arc seconds as measured. Prior to leaving the lab, the reference cube was readjusted to ~1 arc second relative to the beam expander and the stage was again tack bonded in place.

Two iterations of the probing software program and table adjustments were again run and the reference cube was aligned to the machine space to within ~5 arc seconds. The required hole position offset to account for the third axis was calculated to be 0.00401. The plane and the drilled, reamed and countersunk holes were machined in a similar fashion. One hole allowed a light press with the pin, but the other hole had to be lightly peened to achieve a press fit.

Measuring the results showed that the reference cube had moved again, although this time the beam expander to reference cube offset was only ~7 arc seconds as opposed to ~13 from the first run. The pressed in pins provided a much more secure and repeatable interface with the Zygo block. The newly machined datums measured ~26 arc seconds relative to the reference cube and ~27 arc seconds relative to the beam expander. The reference cube was left in the ~7 arc second position for the next run.

The two probing and adjustment iterations resulted in a reference cube to machine space alignment of ~5 arc seconds with a calculated hole position offset of 0.00392. At this point, a 0.0001 incremented Brown & Sharpe dial indicator was installed on the spindle to provide a check of the measurements. The two axes of machine table rotation we had zeroed showed essentially no deflections of the indicator pointer, and the measurements made across the third axis correlated very well with the 0.00392 offset derived from our probe measurements and calculations. Machine cuts were again made in the same manner. Variation in hole size was again a factor. This time the experiment used one size larger than best fit Deltronic pins and installed with a gentle press fit. This proved to be even more stable than the peened pin holes.

Measurements of the result showed that the reference cube had stayed in its ~7 arc second position relative to the beam expander. Other measurements ended up being the worst of the five test cuts. The newly machined datums were ~31 arc seconds relative to the beam expander and ~40 arc seconds relative to the reference cube. The ~40 arc second number had to be calculated as a vector sum of the tilts between the reference cube and the Zygo block resting on the datums because the tilt magnitude was more than could be seen by the interferometer if one or the other were nulled out. Although the fringes on both surfaces are parallel, they were tilted in opposite directions. The reference cube was left in the ~7 arc second position for the next run.

The next setup and cut was performed in the same manner as the previous cuts. Calculated cube positions and offsets were very similar to previous runs. Lightly pressed Deltronic pins were again used. The measurements made showed that once again the reference cube position had shifted relative to the beam expander and was now at ~16 arc seconds. The overall results, however, were the best of the five test cuts. The newly machined datums were ~10 arc seconds to the reference cube and an impressive ~6 arc seconds to the beam expander.

The final setup and test machining was performed in the same manner as the previous. Calculated cube positions and machine offsets were similar to previous test runs. Lightly pressed Deltronic pins were again used. The measurements made showed the reference cube position relative to the beam expander was now at ~14 arc seconds. The newly machined datums were ~15 arc seconds to the reference cube and ~23 arc seconds to the beam expander.

The results of the five machining tests are summarized in the Table 2. Statistical results were calculated with Excel functions and an on-line calculator located at graphpad.com/quickcalcs/ContMenu.cfm. The small sample size of five test cuts lead to relatively wide confidence intervals. Future projects should plan for a larger sampling. It is interesting to note that the 20 arc second mean value of the sample set of machined datum to beam expander measurements shown in Table 2 correlates well with the 23 arc second RSS value predicted in the tolerance analysis of Table 1.

TABLE 2

Process Results

| Test Cut | Mach Datums to Beam Expander (arc sec) | Mach Datums to Ref Cube (arc sec) |
| --- | --- | --- |
| 1 | 15 | 5 |
| 2 | 27 | 26 |
| 3 | 31 | 40 |

TABLE 2-continued

Process Results

| Test Cut | Mach Datums to Beam Expander (arc sec) | Mach Datums to Ref Cube (arc sec) |
| --- | --- | --- |
| 4 | 6 | 10 |
| 5 | 23 | 15 |
| mean | 20 | 19 |
| std dev | 10 | 14 |
| 95% CI for mean | 8-33 | 2-36 |
| 95% CI for std dev | 6-29 | 8-40 |

The observed mean and standard deviations, 20 and 10 arc seconds respectively, implies a three sigma process capability of 50 arc seconds. Using the worst case values for the mean and standard deviation from the 95% confidence interval, 33 and 29 arc seconds respectively, implies a three sigma process capability of 120 arc seconds.

Accordingly, it was determined that the process of the invention is capable of producing robust, adjustment free optical assemblies for all but the tightest of requirements.

Furthermore, there were three items identified during the test cuts that clearly had a negative influence on the results. First, the probe repeatability being higher than anticipated was exacerbated by the short span between measurements over the 1 inch cube. Previous experience with these probe measurements shows that repeatability in the range of 20-40 micro-inches should be achievable. Also, a larger reference feature should improve the alignment of the reference to the interferometer and improve the accuracy of the offsets calculated through the probe measurements.

Secondly, the oversized pin holes and inconsistency from hole to hole casts doubt on whether the test cuts were truly representative of our best machining capability. Also, the small diameter pins were deflecting under the load of the Zygo block. Due to the lack of optimization of the machine control software for the specific tooling arrangement's mass and center of gravity, the sub arc second capability of the tool was not realized.

Third, the movement of the reference cube from its initial position at some point during the process suggests that the cuts may not have been nominally zeroed to the beam expander line of sight. Improved reference feature mounting and adjustment mechanisms should improve this.

Thus, the invention has a three sigma capability of machining interface datums to the line of sight of an afocal optical assembly to within ~60 arc seconds, and a stretch capability of <10 arc seconds. The invention thus permits no-adjustment-required, fully interchangeable LRUs with improved line of sight performance which are more robust over temperature and vibration, improved test yields, and concomitant new options for optical and mechanical designers The preceding example can be repeated with similar success by substituting the generically or specifically described operating conditions of this invention for those used in the preceding examples.

Note that in the specification and claims, "~", "about", or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of assembling an optical device, the method comprising the steps of:
   placing in a housing an optical element comprising one or more interface datums;
   aligning the optical element to a reference feature to determine an amount of finish machining of the one or more interface datums needed; and
   finish machining the one or more interface datums according to results of the aligning step.

2. The method of claim 1 additionally comprising the step of repeating the aligning step after the finish machining step.

3. The method of claim 2 additionally comprising the step of repeating the finish machining step after repeating the aligning step.

4. The method of claim 1 wherein the reference feature comprises a null wavefront orientation plane.

5. The method of claim 1 wherein the aligning step comprises employing an interferometer.

6. The method of claim 1 wherein the reference feature comprises a reference cube.

7. The method of claim 6 wherein the reference feature comprises a one-inch reference cube.

8. The method of claim 1 additionally comprising the step of reassembling the housing and optical element after the finish machining step.

9. The method of claim 8 wherein the reassembling step results in an alignment of the optical element within about 120 arc seconds of line of sight of the optical device.

10. The method of claim 9 wherein the reassembling step results in an alignment of the optical element within about 60 arc seconds of line of sight of the optical device.

* * * * *